US009363626B2

(12) United States Patent  
Chow et al.

(10) Patent No.: US 9,363,626 B2  
(45) Date of Patent: Jun. 7, 2016

(54) DETERMINING FAULTY NODES WITHIN A WIRELESS SENSOR NETWORK

(71) Applicant: City University of Hong Kong, Kowloon (HK)

(72) Inventors: Wai-shing Tommy Chow, Hong Kong (CN); Wai-man Eden Ma, Hong Kong (CN); Chun-piu Lau, Hong Kong (CN)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 174 days.

(21) Appl. No.: 14/164,906

(22) Filed: Jan. 27, 2014

(65) Prior Publication Data

US 2015/0215155 A1 Jul. 30, 2015

(51) Int. Cl.
*H04L 1/00* (2006.01)
*H04W 4/00* (2009.01)

(52) U.S. Cl.
CPC .................................... *H04W 4/005* (2013.01)

(58) Field of Classification Search
CPC .............................. H04L 47/10; H04L 47/283
See application file for complete search history.

(56) References Cited

U.S. PATENT DOCUMENTS

| | | | |
|---|---|---|---|
| 6,839,754 B2 * | 1/2005 | Nowak et al. ................. | 709/224 |
| 2005/0037714 A1 * | 2/2005 | Maucksch et al. ......... | 455/67.16 |
| 2006/0133293 A1 * | 6/2006 | Pan ..................... | H04L 43/0847 370/252 |
| 2010/0128703 A1 * | 5/2010 | Brand et al. .................. | 370/338 |
| 2011/0205889 A1 * | 8/2011 | Chen et al. .................... | 370/230 |
| 2013/0217382 A1 * | 8/2013 | Kudo .................... | H04W 24/04 455/423 |

OTHER PUBLICATIONS

Daliri, et al., "Railway security through the use of wireless sensor networks based on fuzzy logic," International Journal of the Physical Sciences, vol. 6, No. 3, pp. 448-458, 2011.
Ray, et al. Accident Detection by Wireless Sensor Network and Sending Rescue Message with GPS', Journal of Computing, vol. 3, No. 11, pp. 69-79, 2011.
Depienne, "Wireless Sensor Networks Application for Agricultural Environment Sensing in Developing Countries," Ecole Polytechnique Federale De Lausanne, 2007. 60 pages.
Baggio, "Wireless sensor networks in precision agriculture," p. 2, 2005, 2 pages.
Gao, et al., "The Advanced Health and Disaster Aid Network: A Light-Weight Wireless Medical System for Triage," IEEE Transactions on Biomedical Circuits and Systems, vol. 1, No. 3, pp. 203-216, Sep. 2007, 14 pages.
Mills, "Internet time synchronization: The network time protocol," IEEE Transactions on Communications, vol. 39, No. 10, pp. 1482-1493, Oct. 1991. Retrieved on Apr. 21, 2014, 12 pages.
Akhlaq, et al., "RTSP: An Accurate and Energy-Efficient Protocol for Clock Synchronization in WSNS," IEEE Transactions on Instrumentation and Measurement, vol. 62, No. 3, pp. 578-589, Mar. 2013.
Lee, et al., "IEEE 1588 standard for a precision clock synchronization protocol for networked measurement and control systems," NISTIR 7070, Sep. 2003, 154 pages.

(Continued)

*Primary Examiner* — Shaq Taha
(74) *Attorney, Agent, or Firm* — Amin, Turocy & Watson, LLP

(57) ABSTRACT

Probabilities are trained herein to test a wireless network system based on normal and faulty node conditions. The probability information is then used to identify normal and faulty networks during testing, which generates an indication of faulty nodes or an indication of a normal transmission path.

20 Claims, 8 Drawing Sheets

(56) References Cited

OTHER PUBLICATIONS

Youn, et al., "Class dependent feature scaling method using naive Bayes classifier for text datamining," Pattern Recognition Letters, vol. 30, No. 5, pp. 477-485, Apr. 2009.

Soria, et al., "A 'non-parametric' version of the naive Bayes classifier," Elsevier; Knowledge-Based Systems, vol. 24, No. 6, pp. 775-784, Aug. 2011, 10 pages.

Koc, et al., "A network intrusion detection system based on a Hidden Naive Bayes multiclass classifier," Expert Systems with Applications, vol. 39, No. 18, pp. 13492-13500, Dec. 2012.

Sengupta, et al., "On Self-Diagnosable Multiprocessor Systems: Diagnosis by the Comparison Approach," IEEE Transactions on Computers, vol. 41, No. 11, pp. 1386-1396, 1992.

Buratti, et al., "An overview on wireless sensor networks technology and evolution," Sensors (Basel, Switzerland), vol. 9, No. 9, pp. 6869-6896, Jan. 2009, ISSN 1424-8220, 28 pages.

Shalini, "Global Markets and Technologies for Wireless Sensors," 2012, 23 pages.

Liu et al., "A low cost and accurate indoor localization algorithm using label propagation based semi-supervised learning", Dec. 16-19, 2009.

Non-Final Office Action, Dated Nov. 6, 2015, for U.S. Appl. No. 14/184,916, 21 pages.

\* cited by examiner

DETERMINING FAULTY NODES WITHIN A WIRELESS SENSOR NETWORK

TECHNICAL FIELD

This disclosure relates generally to facilitation of detection of faulty nodes based on conditional probabilities.

BACKGROUND

Wireless Sensor Networks (WSNs) are made of spatially distributed sensors to monitor physical or environmental conditions; these sensors cooperatively pass their data through the network to a main location. WSN system monitoring and controls are used in a variety of applications such as: railway security, transportation systems, agricultural monitoring, healthcare devices, etc. The cost of sensor nodes is variable depending on the complexity of the individual sensor nodes. Therefore, size and cost constraints on sensor nodes result in corresponding constraints on resources such as energy, memory, computational speed, and communications bandwidth. Failures within these sensor nodes may occur due to signal disturbance, battery depletion, and/or excessive data transmissions. Therefore, a failure detection scheme, with low energy consumption, is needed to minimize the maintenance costs and maximize network performance.

The above-described background relating to WSN fault detection is merely intended to provide a contextual overview of some current technology, and is not intended to be exhaustive. Other context regarding the state of the art may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

Described herein are systems, methods, articles of manufacture, and other embodiments or implementations that can facilitate establishment of WSN fault detection. Facilitating the establishment of WSN fault detection can be implemented in connection with any type of device with a connection to a communications network (a wireless communications network, the Internet, or the like), such as a mobile handset, a computer, a handheld device, or the like.

According to one embodiment, described herein is a method for determining packet transmission time of a network. The method can determine whether a condition, relating to a failure of sensor nodes of the network is satisfied based on a comparison between the end-to-end packet transmission time and a relationship defined based on conditional probabilities.

According to another embodiment, an article of manufacture, such as a computer readable storage medium or the like, can store instructions that, when executed by a computing device, can facilitate the determining of end-to-end packet transmission time of a network. The article of manufacture can detect a failure condition based on end-to-end packet transmission time being compared to a condition defined based on conditional probabilities.

According to yet another embodiment, described herein is an apparatus for determining one or more end-to-end packet transmission times of a network. The apparatus can determine whether a condition, relating to a sensor node failure of the network is satisfied based on a comparison between the end-to-end packet transmission time and a relationship defined based on conditional probabilities.

Additionally, according to a further embodiment, described herein is a system that can provide a determination of one or more end-to-end packet transmission times of a network. The system can determine whether a condition, relating to a sensor node failure of the network is satisfied based on a comparison between the end-to-end packet transmission time and a relationship defined based on conditional probabilities. The system can include a display component that can be used to access information about the faulty network.

These and other embodiments or implementations are described in more detail below with reference to the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
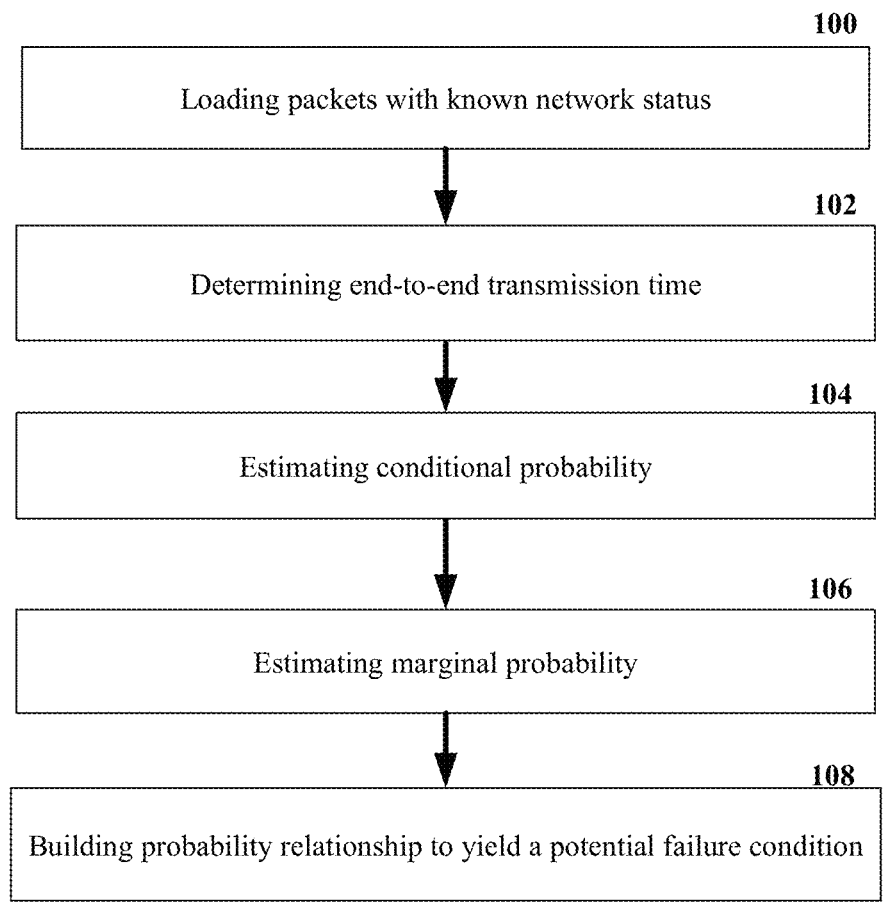
FIG. 1 illustrates a flowchart of an end-to-end packet transmission time training that can be used to determine relationship between the end-to-end packet transmission time and their probabilities to yield failure condition.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

In various embodiments, existing information used in a packet frame protocol can be used to detect failures. In this regard, using existing information in a packet frame protocol uses less energy because additional diagnostic packet transmissions are not implicated. The use of hardware clocks within the sensor nodes for communication protocols and time synchronization technologies have made the use of end-to-end packet transmission delay detection a viable failure detection method. Therefore, end-to-end packet transmission delays can be used to assess the network status based upon the premise that abnormal delays may be caused by faulty nodes or network congestion; this allows for the system to be trained with limited historical operation data and provide relatively accurate failure reports.

Each sensor in a WSN node can have several components, e.g., a radio transceiver with an internal antenna or connection to an external antenna, a microcontroller, an electronic circuit for interfacing with the sensors and an energy source, usually a battery or an embedded form of energy harvesting. It is possible for one or more of these components to fail causing a node failure.

Failure detection technology is generally classified as centralized approaches and distributed approaches. The centralized approach usually makes the diagnostic decisions by periodically injecting requests or queries to other nodes and waits for replies. The updated network status and individual node performance is assessed according to the status reporting messages from nodes or data comparison with neighbors. The distributed approaches compare data obtained from the neighboring nodes and disseminates failure detections at each node. The two existing approaches require additional communication packets to update node statuses.

As an overview of the various embodiments presented herein, to correct for the above identified deficiencies and other drawbacks of detection of faulty nodes, various embodiments are described herein to facilitate detection of faulty nodes.

The Naïve Bayes Equation (1) is:

$$P(A|B) = \frac{P(A|B)P(A)}{P(B)},$$

where $P(A|B)$ is the is the conditional probability 104 that event A will occur given that event B has occurred already and vice versa for $P(B|A)$; $P(A)$ and $P(B)$ represent the marginal probability 106 regardless of whether other events occurred. When m classes are denoted as $C_1, C_2, \ldots, C_m$ and n-dimensional vector $S=\{s_1, s_2, \ldots, s_n\}$, the a posterior probability of $C_i$ with attribute values $s_1, s_2, \ldots s_n$ is denoted as: Equation (2) $P(C=C_i, S_1=s_1, S_2=s_2, \ldots, S_n=s_n)$.

The independent assumption of Naïve Bayes is that the attribute of vector S is independent of all other attribute values. According to the Bayes Theorem, Equation (2) can be presented as: Equation (3) $P(C=C_i)\Pi_{j=1}^{n}P(S_j=s_j|C=C_i)$, where the sum of marginal probability is represented by $\Sigma_{i=1}^{m}P(C=C_i)=1$ and the sum of the conditional probability in a specific condition is represented by $\Sigma_{j=1}^{n}P(S_j=s_j|C=C_i)=1$. To implement the Naïve Bayes classifier, the marginal probability estimate and the conditional probability estimate can be defined by the training of FIG. 1. Because it is impossible to train the conditional probabilities for all cases of a WSN, a Maximum Likelihood Estimation (MLE) can be used to estimate the conditional probability by a specific Probability Density Function (PDF). Assuming the training attribute value $S=\{s_1, s_2, \ldots s_n\}$ has a joint density denoted by Equation (4) $f_\theta(s_1, s_2, \ldots, s_n)=f(s_1, s_2, \ldots, s_n|\theta)$, the likelihood of $\theta$ can be represented by: Equation (5) $\text{lik}(\theta)=f(s_1, s_2, \ldots s_n|\theta)=\Pi_{i=1}^{n}f(s_i|\theta)$, where S is independent and identically distributed. The MLE of $\theta$ is to maximize $\text{lik}(\theta)$. The log likelihood of Equation (5) can usually be maximized by: Equation (6) $L(\theta)=_{i=1}^{n} \ln(f(s_i|\theta))$. The MLE $\hat{\theta}$ can be estimated by finding the derivative. The MLE can estimate the PDFs in both normal scenes and faulty scenes, allowing for probabilities of extreme delay inputs according to the training data.

FIGS. 1-6 illustrate methods that facilitate fault detection within a WSN. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Referring now to FIG. 1, illustrated is a schematic process flow diagram of a method for end-to-end packet transmission delay training that can be used to train a class to determine a minimum end-to-end packet transmission delay within a WSN. The training can utilize packet data propagated to a sink node from a source node via a hop-by-hop transmission process. The packet data can comprise information, including but not limited to: time indication for the transmitted packet based on the local clock of the sensor node and source node address. The training can begin by loading the packets with known network status 100 of a known class associated with the WSN into the system and then determining the end-to-end transmission time 102. During the training, the minimum delay of each node can be extracted to define a potential failure condition 108. The failure condition 108 can be generated by utilizing the Naïve Bayes theorem, which provides a relationship between two conditional probabilities.

The two probability normal and faulty estimates used to build the probability relationship, which yields the potential failure condition 108, can be a conditional probability estimation 104 and a marginal probability estimation 106. Both normal and faulty conditional PDF parameters can be estimated by the MLE for each node; and normal and faulty marginal probabilities can be estimated in element 106.

Figure 2:
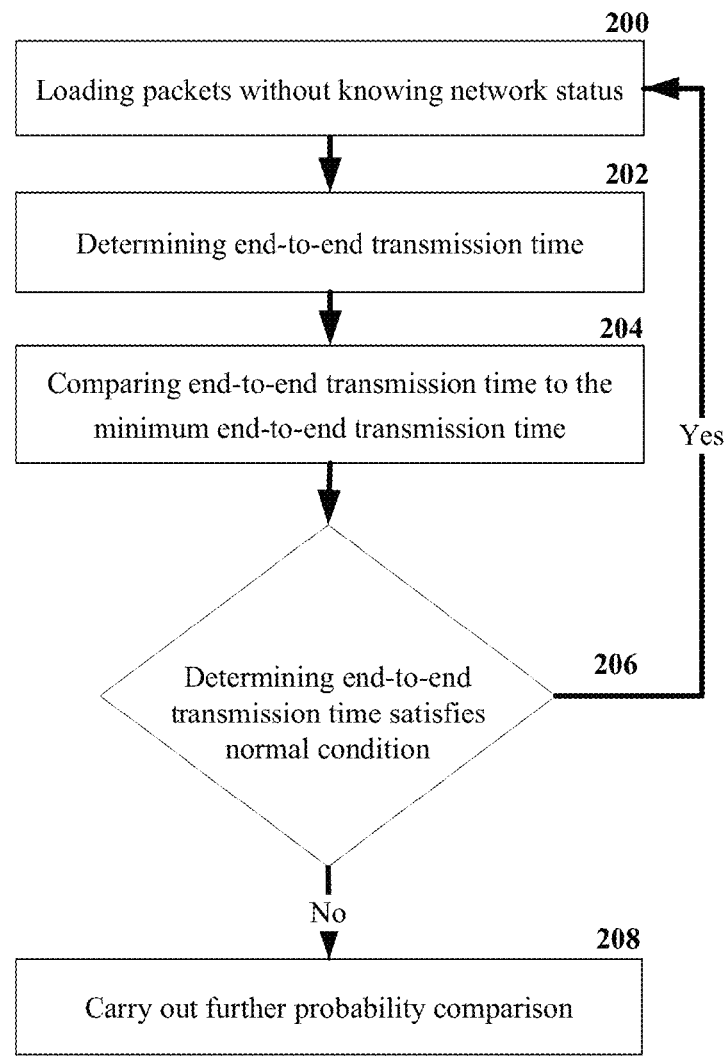
FIG. 2 illustrates a schematic process flow diagram of a method for determining whether it is a normal network based on a comparison between end-to-end packet transmission time and the minimum end-to-end packet transmission time developed during training.

Referring now to FIG. 2, illustrated is a schematic process flow diagram of a method for end-to-end packet transmission delay testing that can be used to screen abnormal delays against the minimum end-to-end packet transmission delay. FIG. 2 illustrates a method resulting in the identification of a normal condition 206 or further probability comparison 208. The testing can utilize packet data propagated to a sink node from a source node via a hop-by-hop transmission process. The packet data can comprise information including but not limited to: end-to-end transmission delay time and source node address. Once packets are loaded without knowing the network status 200, elements 202, 204, and 206 can be used to create a basis for the identification of a normal condition 206 or further probability comparison 208.

Figure 3:
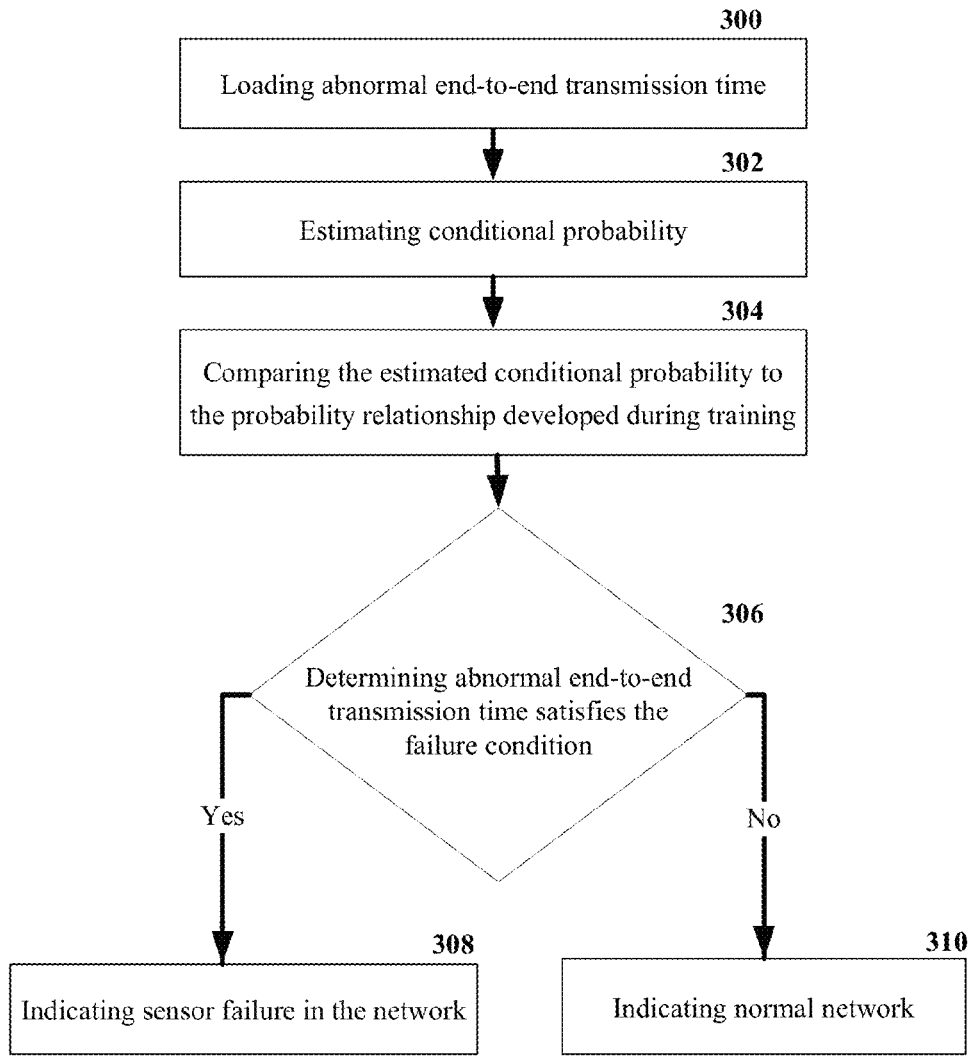
FIG. 3 illustrates is a schematic process flow diagram of a method for evaluating unknown abnormal end-to-end packet transmission times that indicate the packet is from a network with sensor node failure against probability relationships developed during training.

Referring now to FIG. 3, illustrated is a schematic process flow diagram of a method for end-to-end packet transmission delay testing that can be used to test a class against the end-to-end packet transmission delay comprising probability relationships developed during training in FIG. 1. FIG. 3 illustrates a method resulting in the determination of a normal path for nodes associated with a WSN. The testing can utilize packet data propagated to a sink node from a source node via a hop-by-hop transmission process. The packet data can comprise information, including but not limited to: end-to-end packet transmission delay time and source node address. Element 300 can load abnormal end-to-end transmission times and elements 302, 304, and 306 can be used to determine if the abnormal end-to-end transmission times satisfy the failure condition. At element 306 throughout the testing where fault is detected in the network, the system can recursively assess end-to-end packet transmission delay at element 308 and continue to check for faults. The detection can end at element 310 if element 306 indicates negative results of the determination.

Figure 4:
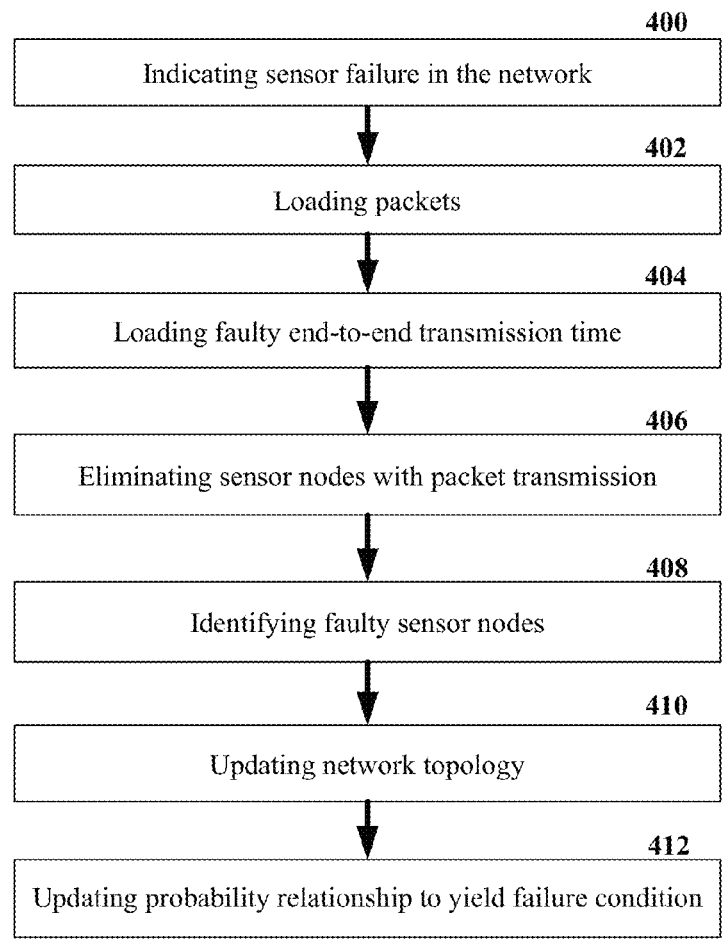
FIG. 4 illustrates a schematic process flow diagram of a method for determining faulty sensor nodes in the network based on end-to-end packet transmission time comprising faulty network indication.

Referring now to FIG. 4, illustrated is a schematic process flow diagram of a method for end-to-end packet transmission delay testing that can be used to identify the faulty node comprising the network failure indication from element 308. A failure indication at element 308 can prompt a failure indication at element 400. Once there is a failure indication reported in element 400, the newly received packets in element 402 and 404 are stored for eliminating the faulty sensor nodes in element 406. If the faulty sensor is identified by the system in element 408, the network topology can be updated in element 410. Element 412 shows that the minimum delay values, conditional probabilities and marginal probabilities can also be renewed by the process shown in FIG. 1.

Figure 5:
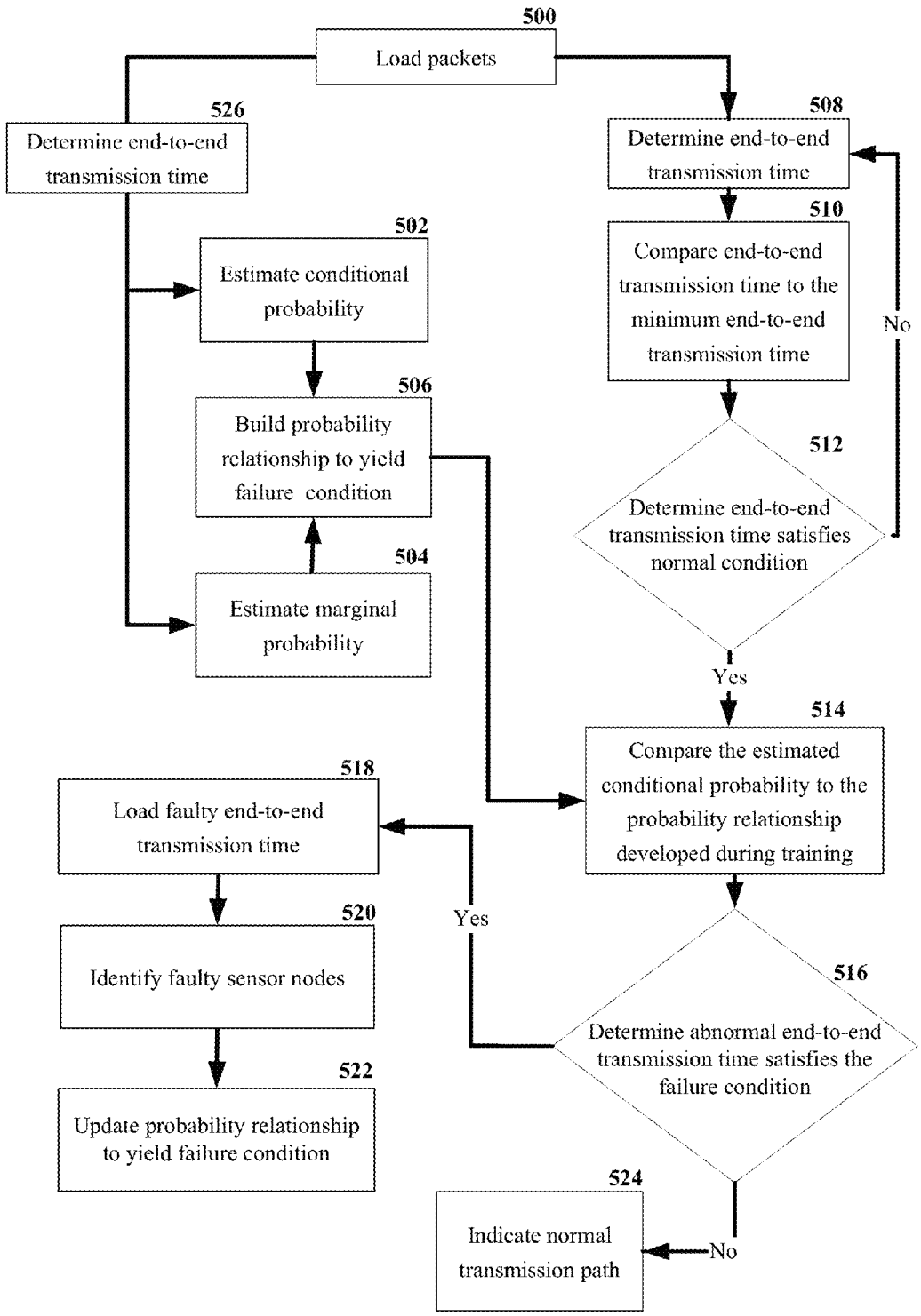
FIG. 5 illustrates a schematic process flow diagram for the method implementation based upon a general operation condition.

Referring now to FIG. 5, illustrated is the training and testing methodologies integrated together in a flowchart. The training phase can gather end-to-end packet transmission delay data, generate relative probabilities based on said data, and can compare said probabilities to end-to-end packet transmission delay data gathered during the testing phase.

The end-to-end packet transmission time 526 can be determined between loading the packets 600 and estimating the conditional probability 502. Elements 502, 504, and 506 can be used to train the system on normal and faulty end-to-end packet transmission delay and then compare this information to actual end-to-end packet transmission delay determined during the testing elements 508 through 516. At each element throughout the testing where there are no faults detected, the system can recursively assess end-to-end packet transmission delay at element 508 and continue to check for faults.

The failure condition 506 can be generated by utilizing the Naïve Bayes theorem, which provides a relationship between two conditional probabilities. The two probability estimates used to build the probability relationship, which the yields failure condition 506, can be a conditional probability estimate 502 and a marginal probability estimate 504. Both normal and faulty conditional PDF parameters can be estimated by the MLE for each node; and normal and faulty marginal probabilities can be estimated.

The testing can begin by loading the packets of a normal class associated with the WSN into the system. During the testing, the end-to-end packet transmission delay of each node can be determined 508 and compared 510 to the minimum end-to-end packet transmission delay collected 526. If the end-to-end packet transmission delay 508 satisfies element 512 the normal delay value, then the end-to-end packet transmission delay 508 can be compared 514 to the failure condition 506 yielded by the conditional probability estimate 502 and the marginal probability estimate 504. Should the end-to-end packet transmission delay 508 also satisfy 516 the failure condition 506, then the network can be determined to be faulty 518; the faulty node associated with said network can be identified 520 and the information associated with the faulty node can be updated in the data structure 522. However, should the end-to-end packet transmission delay 508 not satisfy 516 the failure condition 506, then the network can present an indication of a normal transmission path 524.

Figure 6:
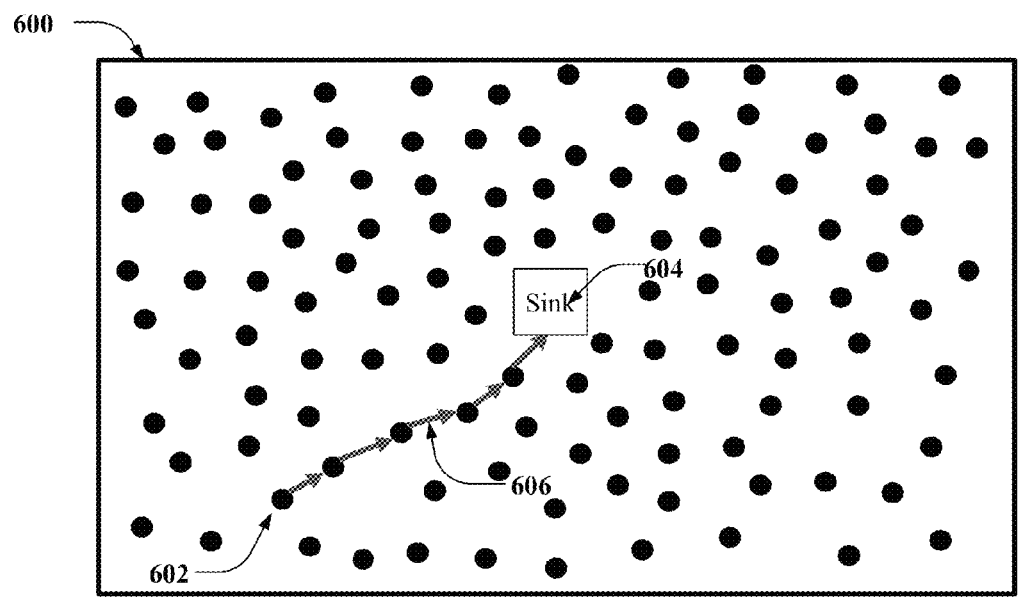
FIG. 6 illustrates a normal end-to-end packet transmission in a network.

Referring now to FIG. 6, illustrated is a normal delay end-to-end packet transmission from the source node 602 to the sink node 604 within the WSN 600. Within the WSN 600, each node can be connected to at least one sensor. Information obtained by the a sensor associated with the source node 602 can be propagated through the WSN 600 via hop-by-hop transmission and sent to the sink node 604. For purposes of this inventive concept, end-to-end packet transmission delay time and source node data information can be sent to the sink node 604 for analysis. End-to-end packet transmission delay time can be calculated by the time from the source node 602 to the sink node 604. The normal end-to-end packet transmission delay of the WSN 600, during the training of FIG. 1, can be used to train the fault detection system and generate the normal condition 106. A normal end-to-end packet transmission delay of the WSN 600, during the testing phase of FIG. 3, can also generate an indication of a normal transmission path as represented by element 310.

Figure 7:
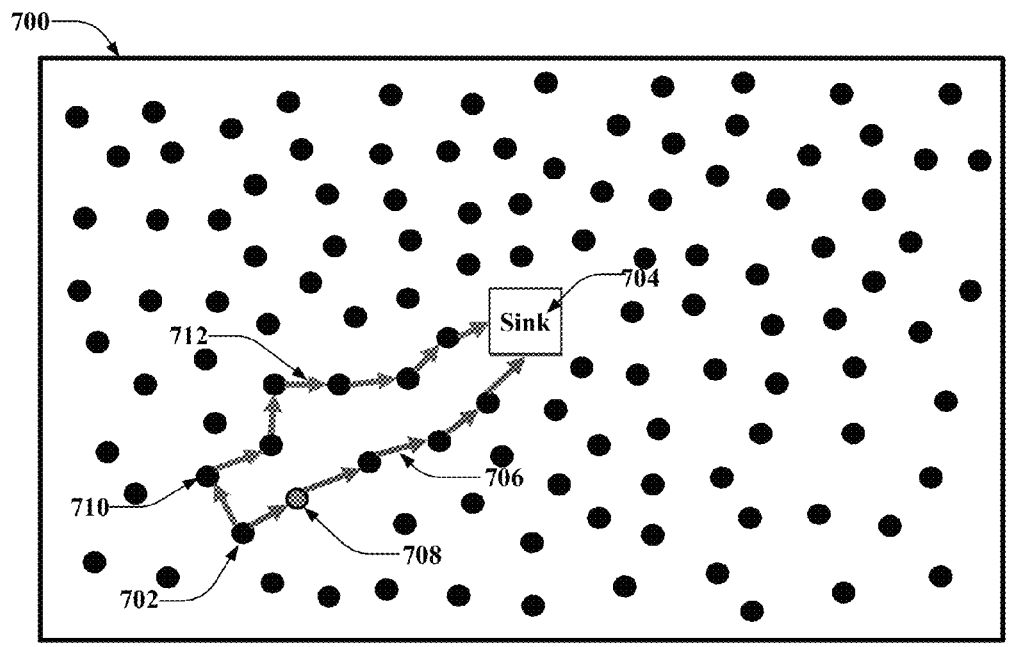
FIG. 7 illustrates a delayed end-to-end packet transmission using an alternate hop route, from the source node to the sink node, to circumvent a faulty node.

Referring now to FIG. 7, illustrated is a delay end-to-end packet transmission using an alternate hop route 712 through an alternate node 710, from the source node 702 to the sink node 704, to circumvent the faulty node 708. Within WSN 700, each node can be connected to at least one sensor. Information obtained by the a sensor associated with the source node 702 can be propagated through the WSN 700 via hop-by-hop transmission and sent to the sink node 704. For purposes of this inventive concept, end-to-end packet transmission delay time of the alternate route 712 and source node 702 information can be sent to the sink node 704 for analysis. End-to-end packet transmission delay time can be calculated by the time of transmission delay from the source node 702 to the sink node 704.

When the faulty node 708 is encountered, the WSN 700 can find an alternate route 712 via an alternate node 710 to transmit information to the sink node 704. The alternate route 712 end-to-end packet transmission delay via the alternate node 710 can be greater than what would be the normal end-to-end packet transmission delay through route 706 via node 708 when node 708 is not faulty. Since node 708 can be determined to be faulty, information from the source node 702 cannot be sent through the normal transmission path 706. However, the information can be sent via the next best route, alternate route 712. The lack of information sent via the faulty node route 706 can help to identify the faulty node 708 in elements 408 (FIG. 4). The normal and faulty end-to-end packet transmission delays of the WSN 700 can be used during the training of FIG. 1 to train the fault detection system and output probabilistic failure conditions 106.

Figure 8:
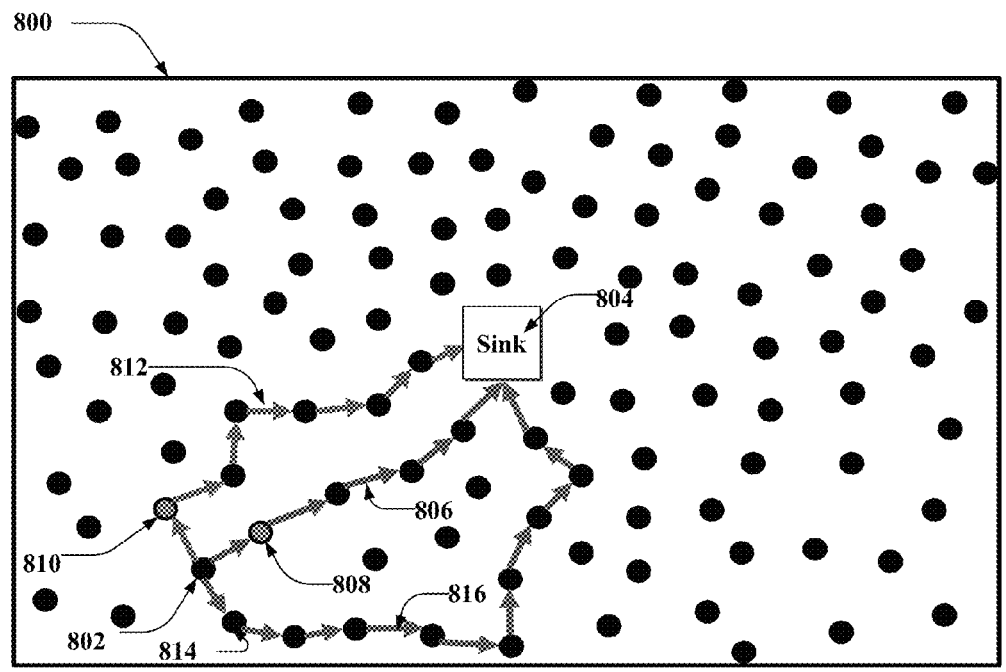
FIG. 8 illustrates a longer delayed end-to-end packet transmission where a plurality of faulty nodes are encountered.

Referring now to FIG. 8, illustrated is a delay end-to-end packet transmission where a plurality of faulty nodes are encountered, therefore necessitating a longer delay end-to-end packet transmission. Within the WSN 800, each node can be connected to at least one sensor. Information obtained by the a sensor associated with the source node 802 can be propagated through the WSN 800 via hop-by-hop transmission and sent to the sink node 804. For purposes of this inventive concept, end-to-end packet transmission delay time and source node data information can be sent to the sink node 804 for analysis. End-to-end packet transmission delay time can be calculated by the time of transmission delay from the source node 802 to the sink node 804.

When faulty node 808 is encountered, the source node 802 can attempt to send information by an alternate route 812. However, alternate route 812 can also contain a faulty node 810. Since node 808 and node 810 can be determined to be faulty, source node 802 information cannot be sent to the sink node 804 along the faulty node routes of 806 or 812. The lack of information sent to the sink node 804, from faulty nodes 808 and 810, can help to identify the faulty nodes in elements 408 (FIG. 4). The source node 802 can then attempt to send information by a second alternate route 816 via second alternate node 814. The second alternate route 816 can require end-to-end packet transmission delay, from source node 802 to sink node 804, which can be longer than the routes of 806 and 812. The normal and faulty end-to-end packet transmission delays of the WSN 800 can be used during the training of FIG. 1 to train the fault detection system and output probabilistic failure conditions 106.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, handheld computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Zigbee, WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method comprising:
   determining, by a system comprising a processor, one or more end-to-end packet transmission delays associated with one or more packets of a network;
   determining, by the system, maximum a posteriori probabilities that one or more faulty nodes exist during a training process related to the one or more end-to-end packet transmission delays, wherein the maximum a posteriori probabilities comprise a marginal probability and a conditional probability;
   determining, by the system, that a condition relating to a failure of one or more nodes of the network is satisfied based on a comparison between the one or more end-to-end packet transmission delays and a relationship defined based on the maximum a posteriori probabilities; and
   sending, by the system, other packets via an alternate route in response to the determining that the condition is satisfied.

2. The method of claim 1, wherein the determining that the condition is satisfied is further based on a maximum likelihood estimation of one or more conditional probabilities.

3. The method of claim 1, further comprising:
   generating, by the system, the condition relating to the failure comprising an estimate of the conditional probability and an estimate of the marginal probability.

4. The method of claim 3, further comprising:
   comparing, by the system, the one or more end-to-end packet transmission delays to information generated by the relationship defined based on conditional probabilities.

5. The method of claim 1, further comprising:
   extracting, by the system, a first end-to-end packet transmission delay, from the one or more nodes, to determine another condition associated with the maximum a posteriori probabilities.

6. The method of claim 1, wherein the determining that the condition is satisfied comprises:
   comparing, by the system, the condition to the one or more end-to-end packet transmission delays.

7. The method of claim 1, further comprising:
   determining, by the system, that the network is a faulty network in response to the condition being determined to have been satisfied.

8. The method of claim 1, further comprising:
   determining, by the system, that the network is a not a faulty network in response to the condition being determined not to have been satisfied.

9. The method of claim 7, further comprising:
identifying, by the system, a faulty node device of the faulty network based on an association determined between a source node device and the one or more end-to-end packet transmission delays.

10. The method of claim 9, further comprising:
updating, by the system, one or more alternate end-to-end packet transmission routes with data relating to the faulty network.

11. The method of claim 8, further comprising:
presenting, by the system, an indication of a normal transmission path based on the condition being determined not to have been satisfied.

12. A computer-readable storage device comprising executable instructions that, in response to execution, cause a system comprising a processor to perform operations, comprising:
determining one or more end-to-end packet transmission delays associated with one or more packets of a network;
determining whether a condition relating to a failure of the one or more packets of the network is satisfied based on a comparison between the one or more end-to-end packet transmission delays and a relationship defined based on maximum a posteriori probabilities, wherein the maximum a posteriori probabilities comprise a marginal probability and a conditional probability; and
sending other packets via an alternate route in response to identifying a faulty node based on the relationship.

13. The computer-readable storage device of claim 12, wherein the determining whether the condition is satisfied is further based on a maximum likelihood estimation of a probability density function and Naïve Bayes Theorem.

14. The computer-readable storage device of claim 12, wherein the operations further comprise:
generating the condition relating to the failure comprising a first estimate of the conditional probability and a second estimate of the marginal probability.

15. The computer-readable storage device of claim 13, wherein the operations further comprise:
extracting a first normal end-to-end packet transmission delay, from the one or more packets, to determine the condition.

16. An apparatus comprising:
a memory to store executable instructions; and
a processor, coupled to the memory, that executes or facilitates execution of the executable instructions to at least:
determine one or more end-to-end packet transmission delays associated with one or more packets of a network; and
determine that a condition, relating to a failure of the one or more packets of the network is satisfied based on a comparison between the one or more end-to-end packet transmission delays and a relationship defined based on maximum a posteriori probabilities, wherein the maximum a posteriori probabilities comprise a marginal probability and a conditional probability, and wherein the conditional probability comprises a maximum likelihood estimation.

17. The apparatus of claim 16, wherein the processor further executes or facilitates execution of the executable instructions to generate the condition relating to the failure comprising a first estimate of the conditional probability and a second estimate of the marginal probability.

18. The apparatus of claim 16, wherein the processor further executes or facilitates execution of the executable instructions to extract a first end-to-end packet transmission delay of a faulty node, from the one or more packets, to determine the condition.

19. The apparatus of claim 18, wherein the processor further executes or facilitates execution of the executable instructions to determine whether the condition is satisfied by comparing the condition to the one or more end-to-end packet transmission delays.

20. The apparatus of claim 16, wherein the processor further executes or facilitates execution of the executable instructions to select a different route for an end-to-end packet transmission based on an indication that the condition has been determined to have been satisfied.

* * * * *